(12) United States Patent
Lim

(10) Patent No.: US 8,446,750 B2
(45) Date of Patent: May 21, 2013

(54) MEMORY MODULE USING OPTICAL SIGNAL

(71) Applicant: Gwangman Lim, Seoul (KR)

(72) Inventor: Gwangman Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/646,936

(22) Filed: Oct. 8, 2012

(65) Prior Publication Data

US 2013/0028033 A1   Jan. 31, 2013

Related U.S. Application Data

(63) Continuation-in-part of application No. 13/453,333, filed on Apr. 23, 2012, which is a continuation of application No. 13/034,972, filed on Feb. 25, 2011, now Pat. No. 8,174,861, which is a continuation of application No. 11/871,913, filed on Oct. 12, 2007, now Pat. No. 7,916,512.

(30) Foreign Application Priority Data

Feb. 1, 2007   (KR) ...................... 10-2007-0010575

(51) Int. Cl.
  *G11C 13/04* (2006.01)
  *G01J 1/32* (2006.01)

(52) U.S. Cl.
  USPC ........ 365/64; 365/189.08; 365/226; 250/205; 250/214

(58) Field of Classification Search
  USPC ............ 365/191, 64, 189.07, 189.08, 230.06, 365/226; 250/205, 214, 201.1, 551
  See application file for complete search history.

(56) References Cited

U.S. PATENT DOCUMENTS

| | | | |
|---|---|---|---|
| 5,283,885 A | 2/1994 | Hollerbauer | |
| 6,496,304 B2 | 12/2002 | Shiozaki et al. | |
| 6,573,567 B1 | 6/2003 | Nishizawa et al. | |
| 7,092,308 B2 | 8/2006 | Choi et al. | |
| 7,093,766 B2 | 8/2006 | Obana et al. | |
| 2002/0097484 A1* | 7/2002 | Shiozaki et al. | 359/337 |
| 2004/0047169 A1 | 3/2004 | Lee et al. | |
| 2005/0013106 A1 | 1/2005 | Takiar | |
| 2006/0108500 A1* | 5/2006 | Sada et al. | 250/205 |
| 2006/0108510 A1 | 5/2006 | Draper et al. | |

FOREIGN PATENT DOCUMENTS

| | | |
|---|---|---|
| JP | 09-330387 | 12/1997 |
| JP | 2000-3424 | 1/2000 |
| JP | 2001-160125 | 6/2001 |
| JP | 2004-259304 | 9/2004 |

(Continued)

*Primary Examiner* — Richard Elms
*Assistant Examiner* — Hien Nguyen
(74) *Attorney, Agent, or Firm* — Myers Bigel Sibley & Sajovec, P.A.

(57) ABSTRACT

Disclosed is a memory module which includes a memory chip; an external input/output terminal having an electrical signal input/output terminal and an optical signal input/output terminal; an optical signal processor configured to convert a first optical signal input through the optical signal input/output terminal into a first internal electrical signal and to convert a second internal electrical signal into a second optical signal; and a controller configured to provide a first data signal to the memory chip in response to a first external electrical signal input through the electrical signal input/output terminal or the first internal electrical signal and to transfer the second internal electrical signal to the optical signal processor or to output a second external electrical signal to the electrical signal input/output terminal in response to a second data signal output from the memory chip.

20 Claims, 19 Drawing Sheets

FOREIGN PATENT DOCUMENTS

| KR | 1999-0083261 | 11/1999 |
| KR | 10-2004-0033750 | 5/2004 |
| KR | 20-0362446 | 9/2004 |
| KR | 10-2005-005422 | 1/2005 |
| KR | 10-2005-0074161 | 7/2005 |
| KR | 10-2005-0121647 | 12/2005 |

* cited by examiner

MEMORY MODULE USING OPTICAL SIGNAL

CROSS-REFERENCE TO RELATED APPLICATIONS

This application is a continuation-in-part of U.S. patent application Ser. No. 13/453,333 filed Apr. 23, 2012, the entire contents of which are hereby incorporated by reference.

BACKGROUND

The inventive concepts described herein relate to a semiconductor device, and more particularly, relate to a memory module capable of storing data.

As portable devices become popular, memory modules with low power consumption and compact sizes are widely used as storage devices. Therefore, various memory cards having flash memory chips have been introduced as storage devices. Examples of the memory cards are a MultiMedia Card (MMC), a secure digital card (SD card), and a flash card.

Although the memory modules are widely used and have a low data capacity and a low data processing rate, a fast data processing rate is highly advantageous as the data capacity of these memory modules increases.

SUMMARY

One aspect of embodiments of the inventive concept is directed to provide a memory module which comprises a memory chip; an external input/output terminal having an electrical signal input/output terminal and an optical signal input/output terminal; an optical signal processor configured to convert a first optical signal input through the optical signal input/output terminal into a first internal electrical signal and to convert a second internal electrical signal into a second optical signal; and a controller configured to provide a first data signal to the memory chip in response to a first external electrical signal input through the electrical signal input/output terminal or the first internal electrical signal and to transfer the second internal electrical signal to the optical signal processor or to output a second external electrical signal to the electrical signal input/output terminal in response to a second data signal output from the memory chip.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
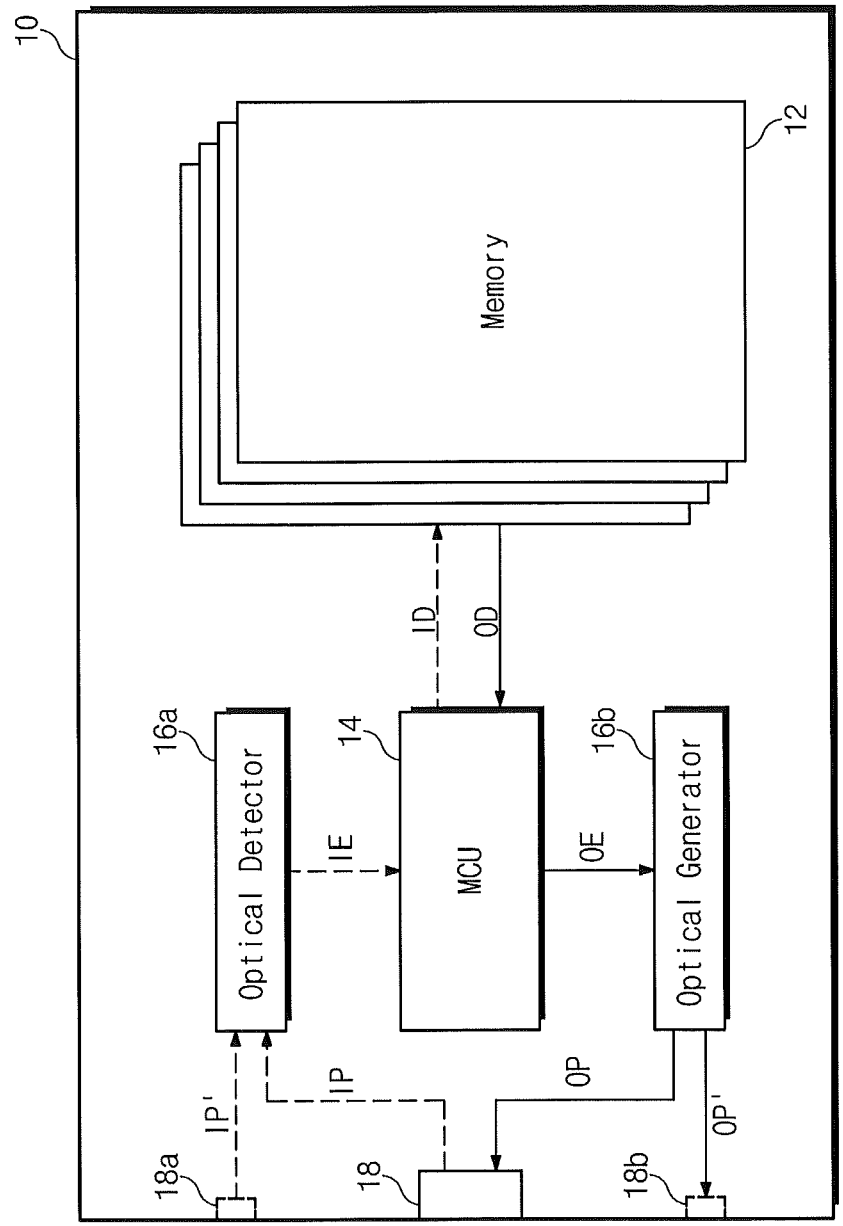
FIGS. 1 to 15 are diagrams illustrating memory modules according to embodiments of the inventive concept.

Exemplary embodiments of the present invention will be described below in more detail with reference to FIGS. 1 through 7. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

FIG. 1 is a block diagram of a memory module according to an embodiment of the present invention.

Referring to FIG. 1, the memory module 10 of this embodiment includes a memory chip 12, a controller 14, an optical detector 16a, and an optical generator 16b. The controller 14 controls an overall operation of the memory module 10. A micro controller unit (MCU) may be used as the controller 14. The controller 14 may be formed integrally with the memory module 10 or separately.

The optical detector 16a converts an optical signal (an external input optical signal) IP received from an external source (not shown) into an internal input signal IE to transmit the converted signal to the controller 14. The optical generator 16b converts an internal output signal OE received from the controller 14 into an external output optical signal OP.

The controller 14 inputs a data signal ID into the memory chip 12 in response to the internal input signal IE received from the optical detector 16a. Also, the controller 14 transmits the internal output signal OE to the optical generator 16b in response to a data signal OD outputted from the memory chip 12.

The memory module 10 may include optical input/output terminals 18. In the external input/output terminals 18, the optical input terminal 18a and the optical output terminal 18b may be formed integrally with the memory module 10 or separately. External input/output optical signals IP' and OP' are transmitted through the external input/output terminals.

The optical detector 16a converts an optical signal into an electrical signal. The optical detector 16a may include a photodiode. The optical detector 16a may include an optical filter and an optical amplifier. The optical generator 16b converts an electrical signal into an optical signal. The optical generator 16b may include a light-emitting diode.

Figure 2:
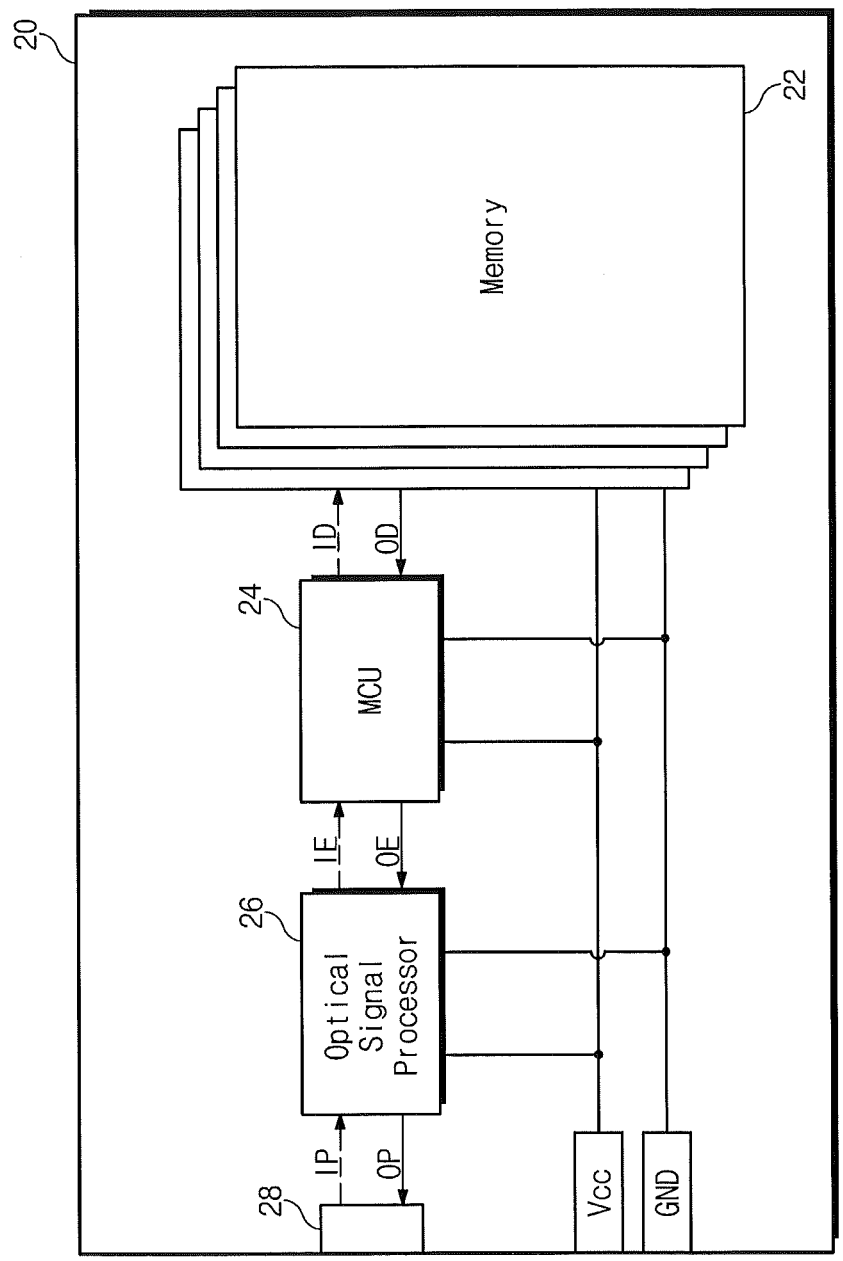

FIG. 2 is a block diagram of a memory module according to another embodiment of the present invention.

Referring to FIG. 2, the memory module 20 of this embodiment includes a memory chip 22, a controller 24, an optical signal processor 26, and power supply terminals Vcc and GND.

The power supply terminals Vcc and GND may be electrically connected to an external power source through an appliance (not shown).

The controller 24 controls an overall operation of the memory module 20. The controller 24 may be implemented using a micro controller unit (MCU). The controller 24 may be formed integrally with the memory module 20 or separately.

The optical signal processor 26 may include the optical detector 16a and the optical generator 16b shown in the embodiment illustrated in FIG. 1. The optical signal processor 26 converts an optical signal (an external input optical signal) IP received from an external source (not shown) into an internal input signal IE to transmit the converted signal to the controller 24. Also, the optical signal processor 26 converts an internal output signal OE received from the controller 24 into an external output optical signal OP.

The controller 24 inputs a data signal ID into the memory chip 22 in response to the internal input signal IE received from the optical signal processor 26. Also, the controller 24 transmits the internal output signal OE to the optical signal processor 26 in response to a data signal OD outputted from the memory chip 22.

The memory module 20 may include an optical input/output terminal 28. In the external input/output terminal 28, the optical input terminal and the optical output terminal may be formed integrally with the memory module 20 or separately as described in the above embodiment. The optical signal processor 26 converts an optical signal into an electrical signal and converts an electrical signal into an optical signal, and may include a photodiode and a light-emitting diode. The optical signal processor 26 may further include an optical filter and an optical amplifier.

Figure 3:
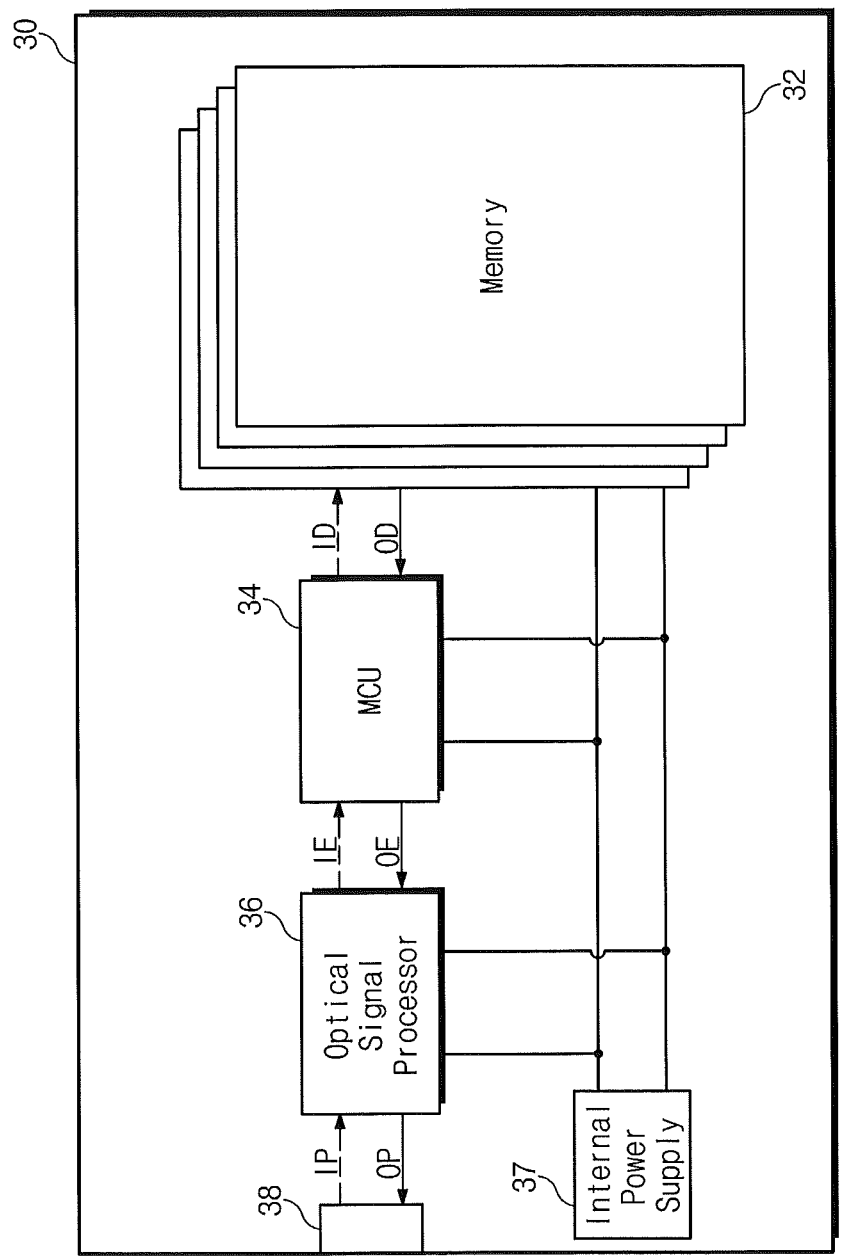

FIG. 3 is a block diagram of a memory module according to yet another embodiment of the present invention.

Referring to FIG. 3, the memory module 30 of this embodiment includes a memory chip 32, a controller 34, an optical signal processor 36, and an internal power supply 37. The internal power supply 37 built in the memory module 30 is a built-in battery. The internal power supply 37 may be an exchangeable or chargeable battery. When the internal power supply 37 is the chargeable battery (not shown), the battery may be connected to an appliance or an auxiliary charger (not shown) for charging.

The controller 34 controls an overall operation of the memory module 30. The controller 34 may be a micro controller unit (MCU). The controller 34 may include a single chip or a plurality of chips.

The optical signal processor 36 may include the optical detector 16a and the optical generator 16b shown in the embodiment illustrated in FIG. 1. The optical signal processor 36 converts an optical signal (an external input optical signal) IP received from an external source (not shown) into an internal input signal IE to transmit the converted signal to the controller 34. Also, the optical signal processor 36 converts an internal output signal OE received from the controller 34 into an external output optical signal OP.

The controller 34 inputs a data signal ID into the memory chip 32 in response to the internal input signal IE received from the optical signal processor 36. Also, the controller 34 transmits the internal output signal OE to the optical signal processor 36 in response to a data signal OD outputted from the memory chip 32.

The memory module 30 may include an optical input/output terminal 38. In the external input/output terminal 38, the optical input terminal and the optical output terminal may be formed integrally with the memory module 30 or separately as described above. The optical signal processor 36 converts an optical signal into an electrical signal and may include a photodiode and a light-emitting diode. The optical signal processor 36 may further include an optical filter and an optical amplifier.

Figure 4:
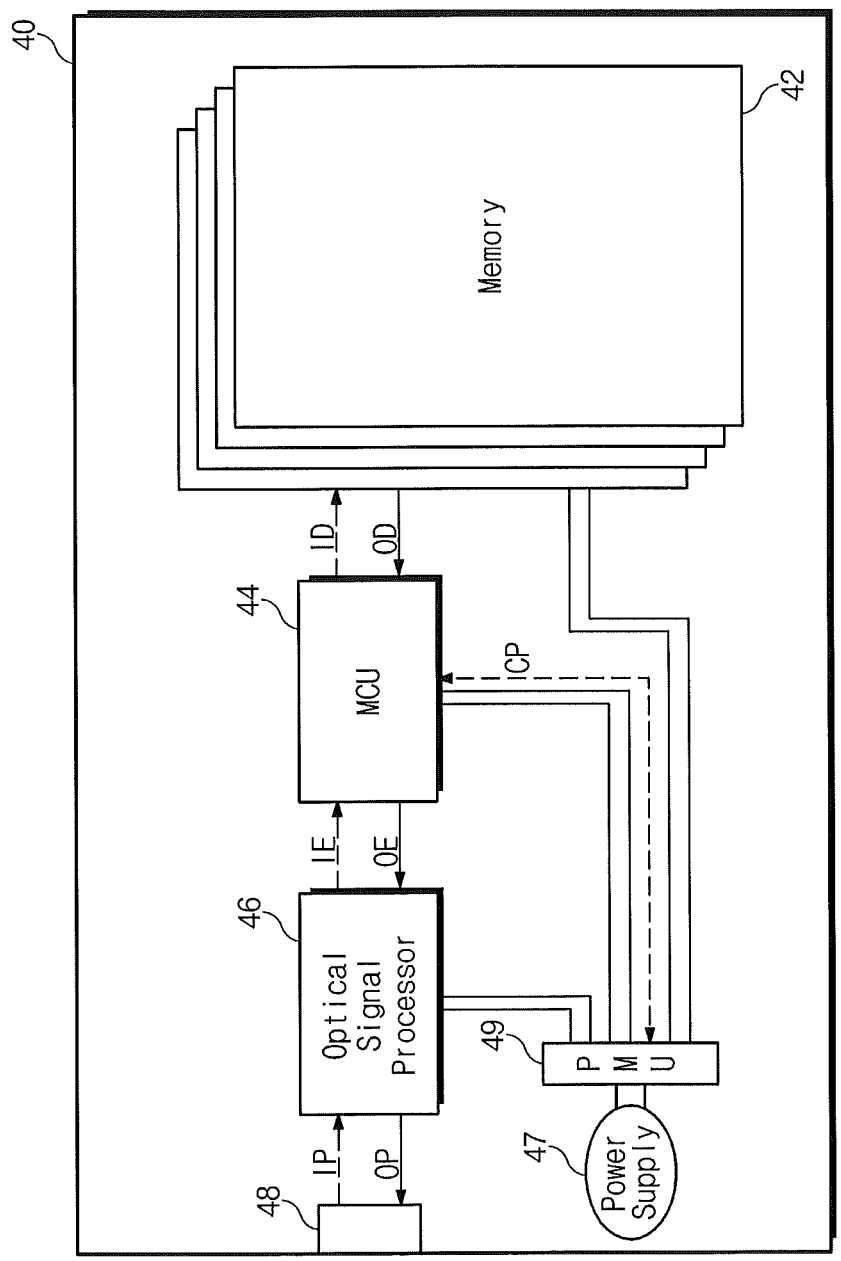

FIG. 4 is a block diagram of a memory module according to still another embodiment of the present invention.

Referring to FIG. 4, the memory module 40 of this embodiment includes a memory chip 42, a controller 44, an optical signal processor 46, an internal power supply 47, and a power management unit (PMU) 49. The internal power supply 47 may be formed in a manner identical to that of the embodiments illustrated in FIGS. 2 and 3. The internal power supply 47 may be electrically connected to an external power source (not shown) through an appliance or may be a battery built in the memory module 40. When the internal power supply 47 is the built-in battery, the battery may be an exchangeable and chargeable battery. When the internal power supply 47 is the chargeable battery, the battery may be connected to an appliance or an auxiliary charger for charging.

Under the control of the controller 44, the PMU 49 selectively supplies an internal power to the optical signal processor 46, the controller 44, and the memory chip 42. As a result, unnecessary power consumption is reduced, which extends the operating time of the battery of the appliance and the battery built-in the memory module.

The controller 44 controls an overall operation of the memory module 40. The controller 44 may be a micro controller unit (MCU). The controller 44 may be formed integrally with the memory module 40 or separately.

The optical signal processor 46 may include the optical detector 16a and the optical generator 16b shown in the embodiment illustrated in FIG. 1. The optical signal processor 46 converts an optical signal (an external input optical signal) IP received from an external into an internal input signal IE to transmit the converted signal to the controller 44. Also, the optical signal processor 46 converts an internal output signal OE received from the controller 44 into an external output optical signal OP.

The controller 44 inputs a data signal ID into the memory chip 42 in response to the internal input signal IE received from the optical signal processor 46. Also, the controller 44 transmits the internal output signal OE to the optical signal processor 46 in response to a data signal OD outputted from the memory chip 42.

The memory module 40 may include an optical input/output terminal 48. In the external input/output terminal 48, the optical input terminal and the optical output terminal may be formed integrally with the memory module 40 or separately as described above. The optical signal processor 46 converts an optical signal into an electrical signal and may include a photodiode and a light-emitting diode. The optical signal processor 46 may further include an optical filter and an optical amplifier.

Figure 5:
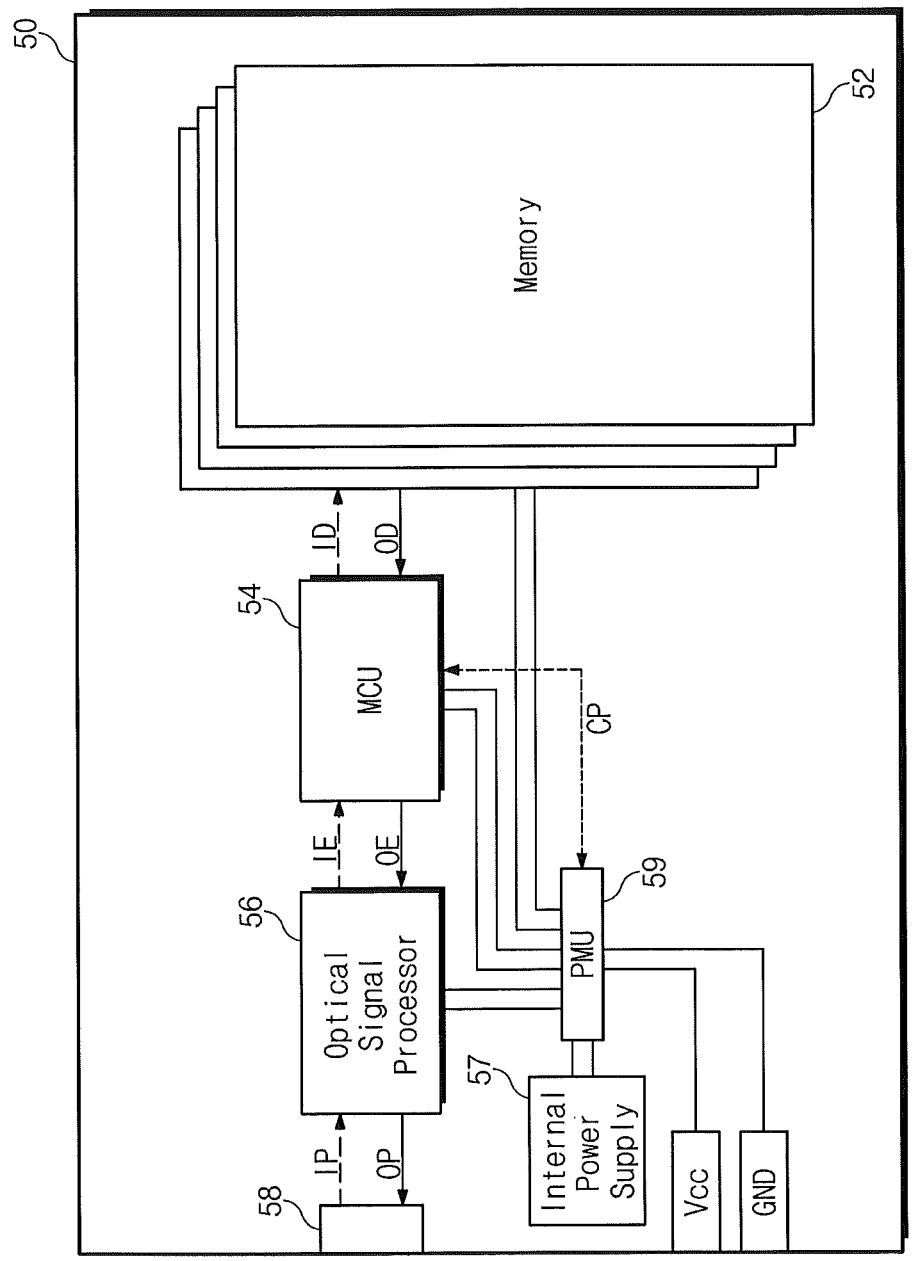

FIG. 5 is a block diagram of a memory module according to another embodiment of the present invention.

Referring to FIG. 5, the memory module 50 of this embodiment includes a memory chip 52, a controller 54, an optical signal processor 56, power supply terminals Vcc and GND, an internal power supply 57, and a power management unit (PMU) 59.

The power supply terminals Vcc and GND may be electrically connected to an external power source (not shown) through an appliance. The internal power supply 57 may be an exchangeable and chargeable battery. When the internal power supply 57 is the chargeable battery, the battery may be connected to an appliance or an auxiliary charger for charging.

Under the control of the controller 54, the PMU 59 selectively supplies an internal power to the optical signal processor 56, the controller 54, and the memory chip 52. As a result, unnecessary power consumption is reduced to extend the operating time of the battery of the appliance and the battery built in the memory module.

The PMU 59 manages an external power through power supply terminals Vcc and GND to supply the power when the power is supplied from the external power supply. The PMU 59 manages the internal power supply 57 to supply a power when the external power is intercepted. Accordingly, in a situation where a power failure suddenly occurs while the memory module is operated using the external power supply, accidental loss of data can be prevented because the memory module can be operated using the internal power supply 57. When the memory module is not used, the memory module may be changed to a power saving mode to reduce the energy consumption of the internal power supply 57.

The controller 54 controls an overall operation of the memory module 50. The controller 54 may be a micro controller unit (MCU). The controller 54 may be formed integrally with the memory module 50 or separately.

The optical signal processor 56 may include the optical detector 16a and the optical generator 16b shown in the embodiment illustrated in FIG. 1. The optical signal processor 56 converts an optical signal (an external input optical signal) IP received from an external into an internal input signal IE to transmit the converted signal to the controller 54. Also, the optical signal processor 56 converts an internal output signal OE received from the controller 54 into an external output optical signal OP.

The controller 54 inputs a data signal ID into the memory chip 52 in response to the internal input signal IE received from the optical signal processor 56. Also, the controller 54 transmits the internal output signal OE to the optical signal processor 56 in response to a data signal OD outputted from the memory chip 52.

The memory module 50 may include an optical input/output terminal 58. In the external input/output terminal 58, the optical input terminal and the optical output terminal may be formed integrally with the memory module 50 or separately as described above. The optical signal processor 56 converts an optical signal into an electrical signal. The optical signal processor 56 may include a photodiode and a light-emitting diode. The optical signal processor 56 may include an optical filter and an optical amplifier.

In the above and other embodiments of the present invention, the memory module may include a plurality of chips. Therefore, the memory module of the present invention can process a large amount of data.

Figure 6:
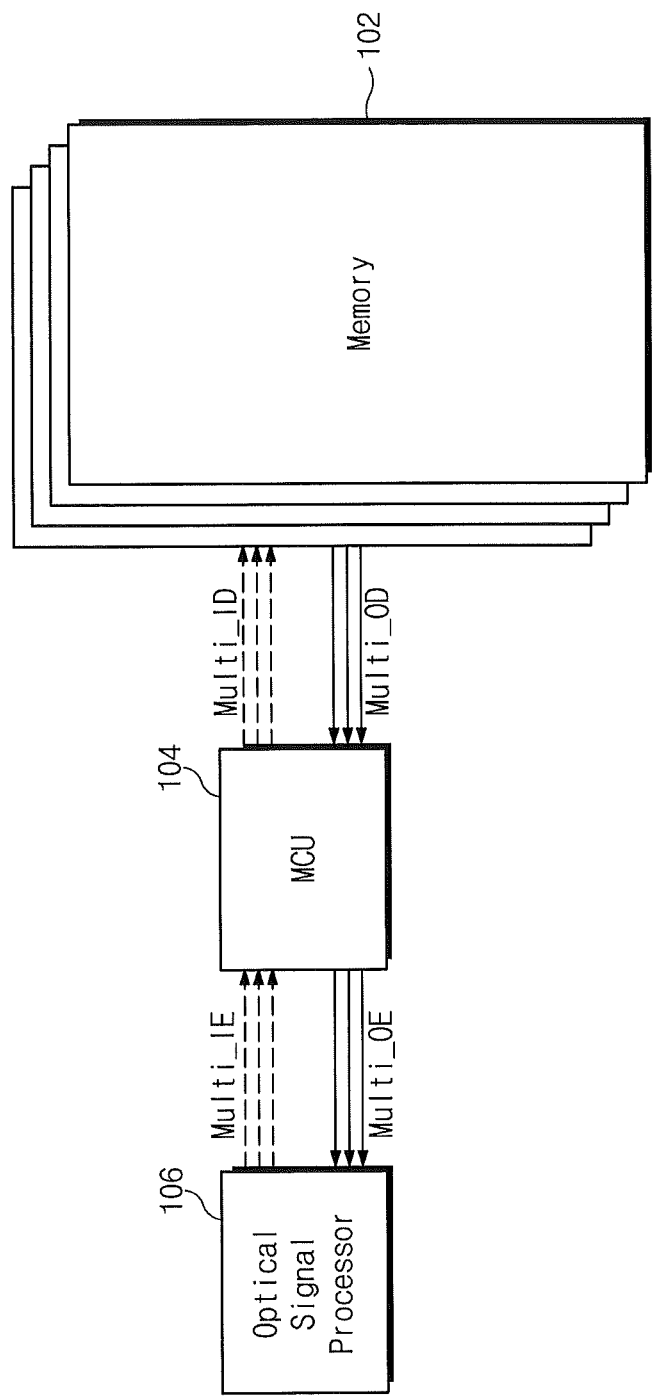

FIG. 6 is a block diagram of a memory module according various example embodiments of the present invention.

Referring to FIG. 6, the memory module includes a plurality of chips 102. Also, the memory module may include multi-channel data paths because the memory module can exchange data with external devices using an optical signal. External input optical signals are inputted to an optical signal processor 106 as wavelength-division-multiplexed multi-channel signals. The optical signal processor 106 divides the external input optical signals according to a plurality of channels based on frequency, amplifies the divided signals, and converts the amplified signals into electrical signals to transmit multi-channel internal input signals Multi_IE to a controller 104. The optical signal processor 106 includes an optical filter, an optical amplifier, and an optical detector. The optical signal processor 106 divides multi-channel internal output signals Multi_OE into multi-channel optical signals to generate external output optical signals. Therefore, the optical signal processor 106 may further include a channel distributor and an optical generator.

The controller 104 transmits divided data signals Multi_ID to memory chips 102 in response to the multi-channel internal input signals Multi_IE transmitted from the optical signal processor 106. The divided data signals Multi_ID are synchronized with a data input clock and distributed to the memory chips 102 by time-division multiplexing. Also, the controller 104 converts a plurality of data signals Multi_OD transmitted from the memory chips into the multi-channel internal output signals Multi_OE, and then transmits the converted signals to the optical signal processor 106 when reading data from the memory chips.

The memory module of the present invention distributes data to the memory chips to process a large amount of data without a data input time delay when the clock frequency of an appliance is greater than that of the memory chips.

Figure 7:
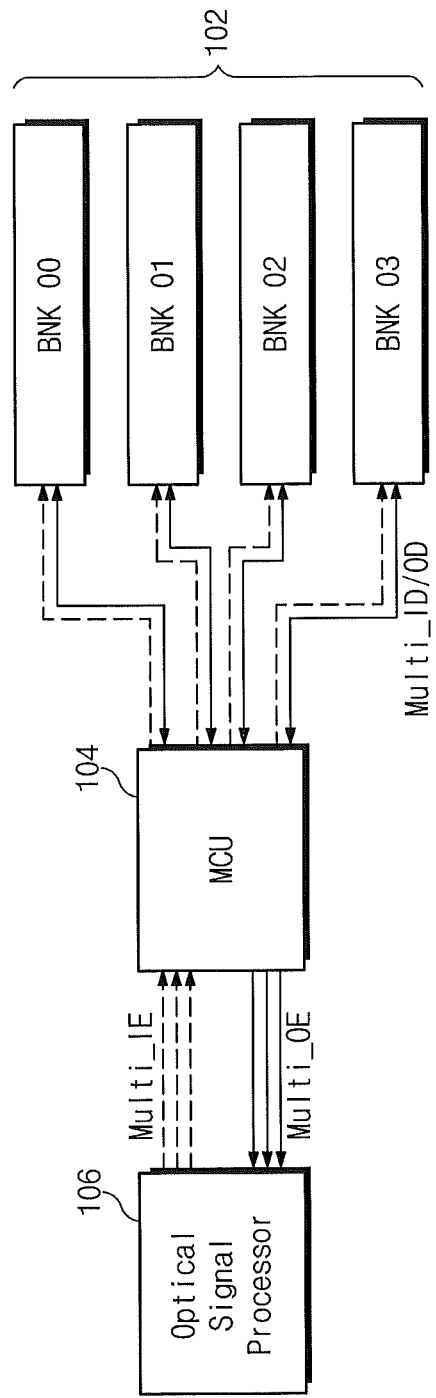

Referring to FIG. 7, a memory chip 102 may include a plurality of memory regions BNKn. The memory regions BNKn may be memory regions logically defined in a single memory chip. On the other hand, the memory regions BNKn may include a plurality of memory chips, which are physically separated from each other. Data received through multi-channels are distributed into and stored in the plurality of memory regions BNKn. Data outputted from the plurality of memory regions BNKn are outputted to an external circuit through the multi-channels.

As described above, the data can be inputted/outputted using the optical signal to remarkably increase the data transfer rate between the appliance and the memory module.

Using a multi-channel characteristic of the optical signal, a large amount of data can be inputted/outputted simultaneously, thereby improving a data processing capacity.

The data transfer rate and the data processing capacity increase using the optical signal and the multi-channel, thereby remarkably improving a data processing rate.

FIGS. 8 to 15 are diagrams illustrating a memory module according to other embodiments of the inventive concept.

Figure 8:
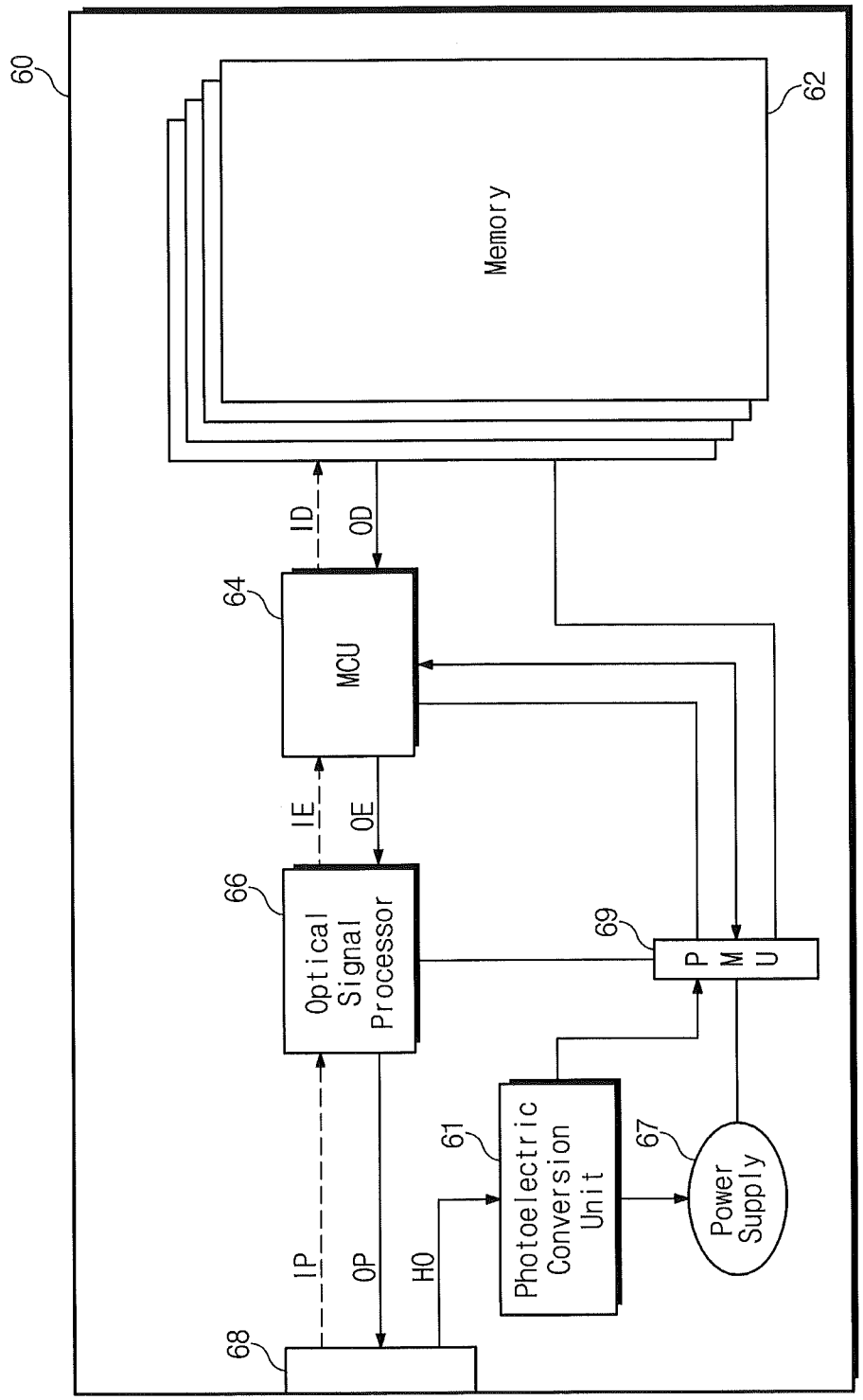

In accordance with an embodiment illustrated in FIG. 8, a memory module 60 may be powered through a high-power optical signal provided from an external device.

Referring to FIG. 8, the memory module 60 may include a photoelectric conversion unit 61, a memory chip 62, a controller 64, an optical signal processor 66, a power supply 67, an external input/output terminal 68, and a power management unit 69.

In example embodiments, the external input/output terminal 68 may include optical signal input/output terminals capable of transferring input/output optical signals IP and OP and an optical power terminal capable of transferring a high power optical signal HO for powering a memory module 60. The external input/output terminal 68 may be configured such that an optical input terminal, an optical output terminal, and an optical signal power terminal are formed by one unit or be formed of independent terminals.

The optical signal processor 66 may convert an optical signal into an electrical signal and an electrical signal into an optical signal. The optical signal processor 66 may convert an external input optical signal IP into an internal input electrical signal IE to provide it to the controller 64. The optical signal processor 66 may convert an internal output electrical signal OE provided from the controller 64 into an external output optical signal OP. For example, the optical signal processor 66 may include a photodiode for converting an optical signal into an electrical signal and a light emitting diode for converting an electrical signal into an optical signal. The optical signal processor 66 may also include an optical filter for removing a noise of an optical signal and an optical amplifier for amplifying an optical signal.

The controller 64 may control an operation of the memory chip 62 and the memory module 60. The controller 64 may be formed of a micro controller unit (MCU), and may be formed of a single chip or a plurality of chips. The controller 64 may provide a data signal ID to the memory chip in response to the internal input electrical signal IE transferred from the optical signal processor 66. The controller 64 may transfer the internal output electrical signal OE to the optical signal processor 66 in response to a data signal OD output from the memory chip 62.

The photoelectric conversion unit 61 may convert the high power optical signal HO input via the optical signal power terminal into an electrical signal to provide it to the power management unit 69. When the power supply 67 is discharged, the photoelectric conversion unit 61 may also provide the power supply 67 with an electrical signal obtained by converting the high power optical signal HO for the power supply 67 to be charged.

The power supply 67 may be an exchangeable or chargeable battery as an internal power embedded in the memory module 60. In example embodiments, the power supply 67 may be charged by an electrical signal obtained by converting the high power optical signal HO via the photoelectric conversion unit 61.

In example embodiments, the power management unit 69 may be controlled by the controller 64. The power management unit 69 may receive an internal power from the power supply 67 or an optical signal power from the photoelectric conversion unit 61. The power management unit 69 may supply an optical signal power or an internal power to the optical signal processor 66, the controller 64, and the memory chip 62. The power management unit 69 may be controlled by the controller 64 to selectively power units. In detail, when the optical signal processor 66 operates, the power management unit 69 may supply the internal power or optical signal power to the optical signal processor 66, and may block a power supplied to the controller 64 and the memory chip 62. When the controller 64 and the memory chip 62 operate, the power management unit 69 may block a power supplied to the optical signal processor 66. That is, the power management unit 69 may selectively power the optical signal processor 66, the controller 64, and the memory chip 62 at a needed time. A life of a battery mounted at the memory module 60 and a life of a battery of an application apparatus may be extended by reducing a power unnecessarily consumed by units that don't operate.

With embodiments illustrated in FIGS. 9 to 15, an optical signal and an electrical signal may be provided to a memory module from an external device via a connector.

Referring to FIGS. 9 to 15, connectors 200 may be connected with external input/output terminals 78, 88, 98, 118, 128, 138, and 148 of memory modules 70, 80, 90, 110, 120, 130, and 140, respectively. The connector 200 may have an optical signal terminal 201 for inputting and outputting an optical signal and an electrical signal terminal 203 for inputting and outputting an electrical signal.

Figure 9:
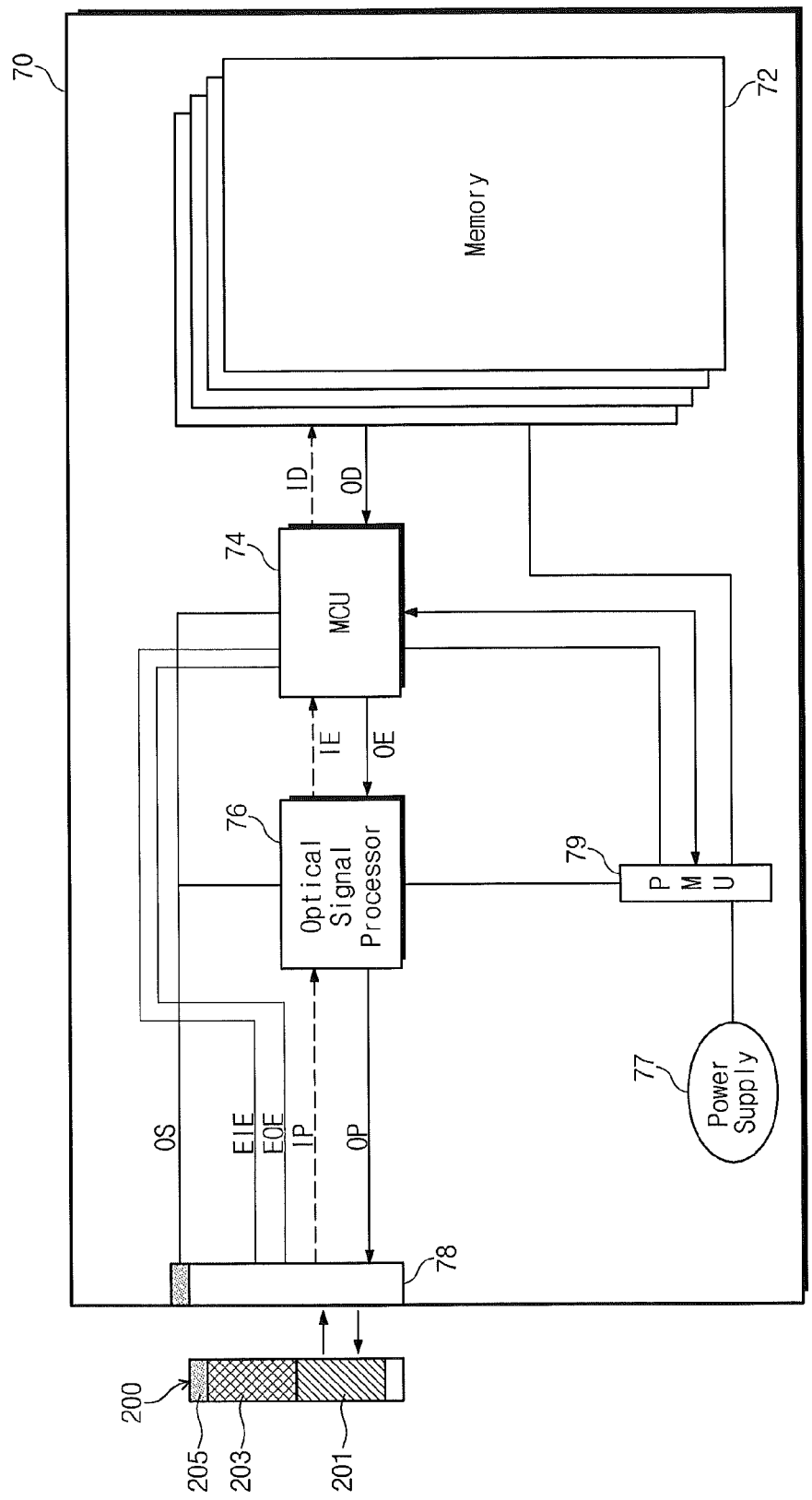

Referring to FIG. 9, the memory module 70 may include a memory chip 72, a controller 74, an optical signal processor 76, a power supply 77, an external input/output terminal 78, and a power management unit 79.

In example embodiments, the external input/output terminal 78 may be connected with the connector 200 having an optical signal terminal 201, an electrical signal 203, and an option terminal 205. An electrical signal, an optical signal, and an option signal may be received via the external input/output terminal 78.

The external input/output terminal 78 may provide an option signal OS input via the option terminal 205 of the connector 200 to the optical signal processor 76 and the controller 74.

The option signal OS may provide information associated with whether a signal input to the memory module 70 is an optical signal or an electrical signal. The option signal OS may have a pulse shape, and the controller 74 may control whether to operate the optical signal processor 76 according to the option signal OS. For example, the option signal OS may have a high level (i.e., a first electrical level) when an optical signal is received and a low level (i.e., a second electrical level) when an electrical signal is received.

When an optical signal is received via the connector 200 (i.e., when the option signal OS is at a first electrical level), the option signal OS may enable the optical signal processor 76 and the controller 74. When an electrical signal is received via the connector 200 (i.e., when the option signal OS is at a second electrical level), the option signal OS may set the optical signal processor 76 to a standby state or stop an operation of the optical signal processor 76, so that a power consumed by the optical signal processor 76 is reduced.

When an external input optical signal IP is received via the connector 200, the optical signal processor 76 may convert an external input optical signal IP input from an external device into an internal input electrical signal IE to provide it to the controller 74. The optical signal processor 76 may convert an internal output electrical signal OE transferred from the controller 74 into an external output optical signal OP. The controller 74 may provide a data signal ID to the memory chip 72 in response to the internal input electrical signal IE transferred from the optical signal processor 76, and may transfer the internal output electrical signal OE to the optical signal processor 76 in response to a data signal OD output from the memory chip 72.

When an electrical signal is received via the connector 200, the controller 74 may receive an electrical signal from the external input/output terminal 78. That is, the controller 74 may provide a data signal ID to the memory chip in response to an external input electrical signal EIE input via the external input/output terminal 78, and may transfer an external output electrical signal EOE to the external input/output terminal 78 in response to a data signal OD output from the memory chip 72.

The power management unit 79 may be controlled by the controller 74, and may power the controller 74 and the memory chip 72. When an optical signal is provided to the external input/output terminal 78 via the connector 200, the power management unit 79 may provide an internal power from the power supply 77 to the optical signal processor 76.

With the embodiment illustrated in FIG. 9, as an electrical signal or an optical signal is input via the external input/output terminal 78, the memory module 70 may operate in response to the optical signal or electrical signal input from an external device. Also, the optical signal processor 76 and the controller 74 may be controlled by an option signal input via the external input/output terminal 78.

Figure 10:
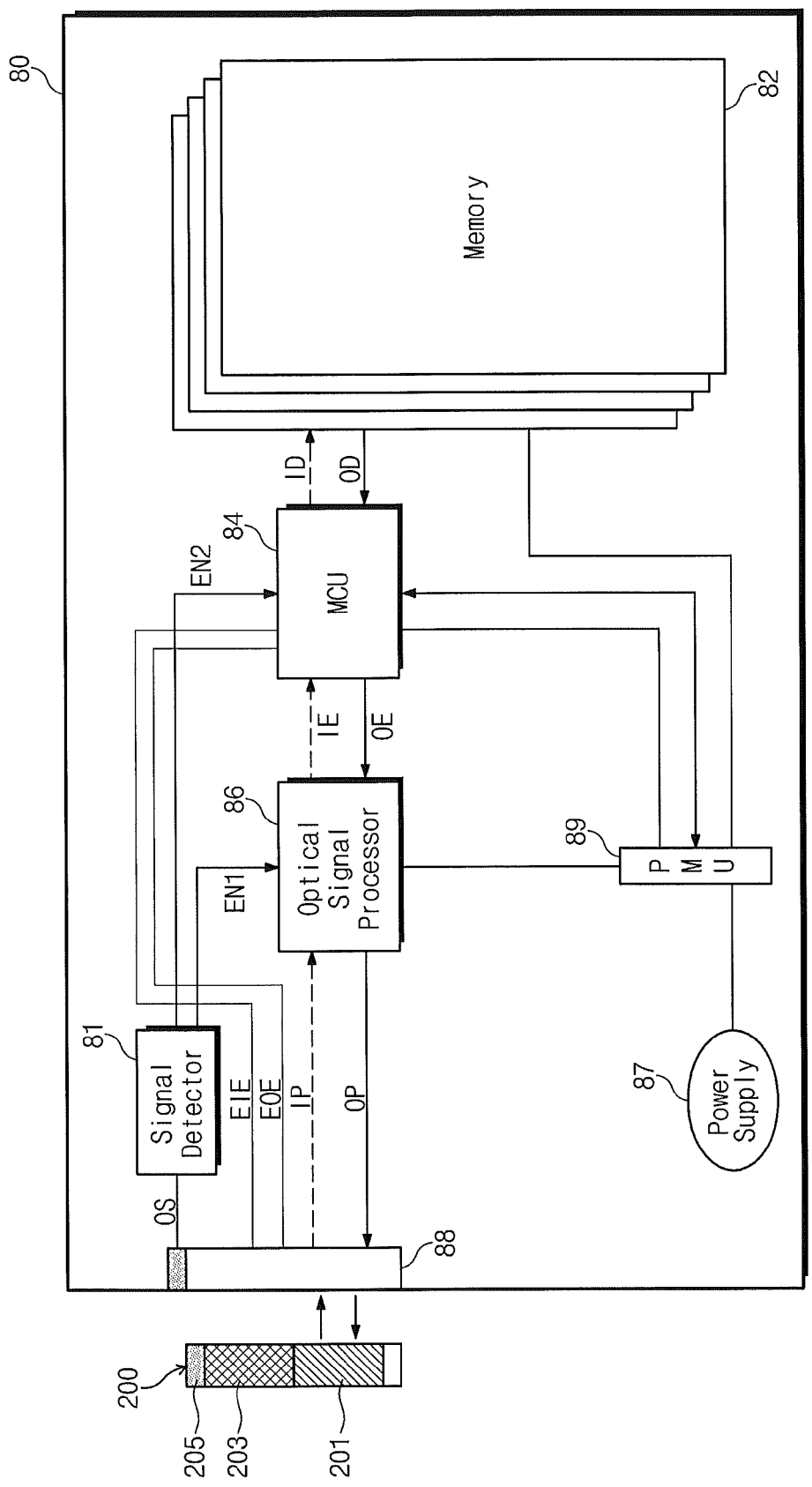

Referring to FIG. 10, the memory module 80 may include a signal detector 81, a memory chip 82, a controller 84, an optical signal processor 86, a power supply 87, an external input/output terminal 88, and a power management unit 89.

The external input/output terminal 88 may be connected with the connector 200 having an optical signal terminal 201, an electrical signal 203, and an option terminal 205. An electrical signal, an optical signal, and an option signal may be received via the external input/output terminal 88.

In example embodiments, the external input/output terminal 88 may provide the signal detector 81 with an option signal OS input via the option terminal of the connector 200. The option signal OS may provide information associated with whether a signal input to the memory module 80 is an optical signal or an electrical signal.

The option signal OS may have a pulse shape, and the signal detector 81 may detect whether the option signal OS is at a high level or at a low level. The signal detector 81 may provide an enable signal to the optical signal processor 86 and the controller 84 according to a level of the option signal OS. In detail, when an optical signal is received through the optical signal terminal 201, the signal detector 81 may provide the optical signal processor 86 with an enable signal EN1. When an electrical signal is received through the optical signal terminal 201, the signal detector 81 may provide the controller 84 with an enable signal EN2.

In case that the enable signal EN1 is provided to the optical signal processor 86 from the signal detector 81, the optical signal processor 86 may convert an external input optical signal IP input from an external device into an internal input electrical signal IE to provide it to the controller 84. Also, the optical signal processor 86 may convert an internal output electrical signal OE transferred from the controller 84 into an external output optical signal OP. The controller 84 may provide a data signal ID to the memory chip 82 in response to the internal input electrical signal IE transferred from the optical signal processor 86, and may transfer the internal output electrical signal OE to the optical signal processor 86 in response to a data signal OD output from the memory chip 82.

If the enable signal EN2 is provided to the controller 84 from the signal detector 81, the controller 84 may be provided with an electrical signal from the external input/output terminal 88. That is, the controller 84 may provide a data signal ID to the memory chip 82 in response to an external input electrical signal EIE input via the external input/output terminal 88, and may transfer an external output electrical signal EOE to the external input/output terminal 88 in response to a data signal OD output from the memory chip 82.

The power management unit 89 may be controlled by the controller 84, and may control supplying of an internal power into the controller 84 and the memory chip 82. When an optical signal is provided to the external input/output terminal 88 via the connector 200, the power management unit 89 may provide an internal power from the power supply 87 to the optical signal processor 86.

With the embodiment illustrated in FIG. 10, the signal detector 81 may detect an electrical level of the option signal OS to control the optical signal processor 86 and the controller 84.

Figure 11:
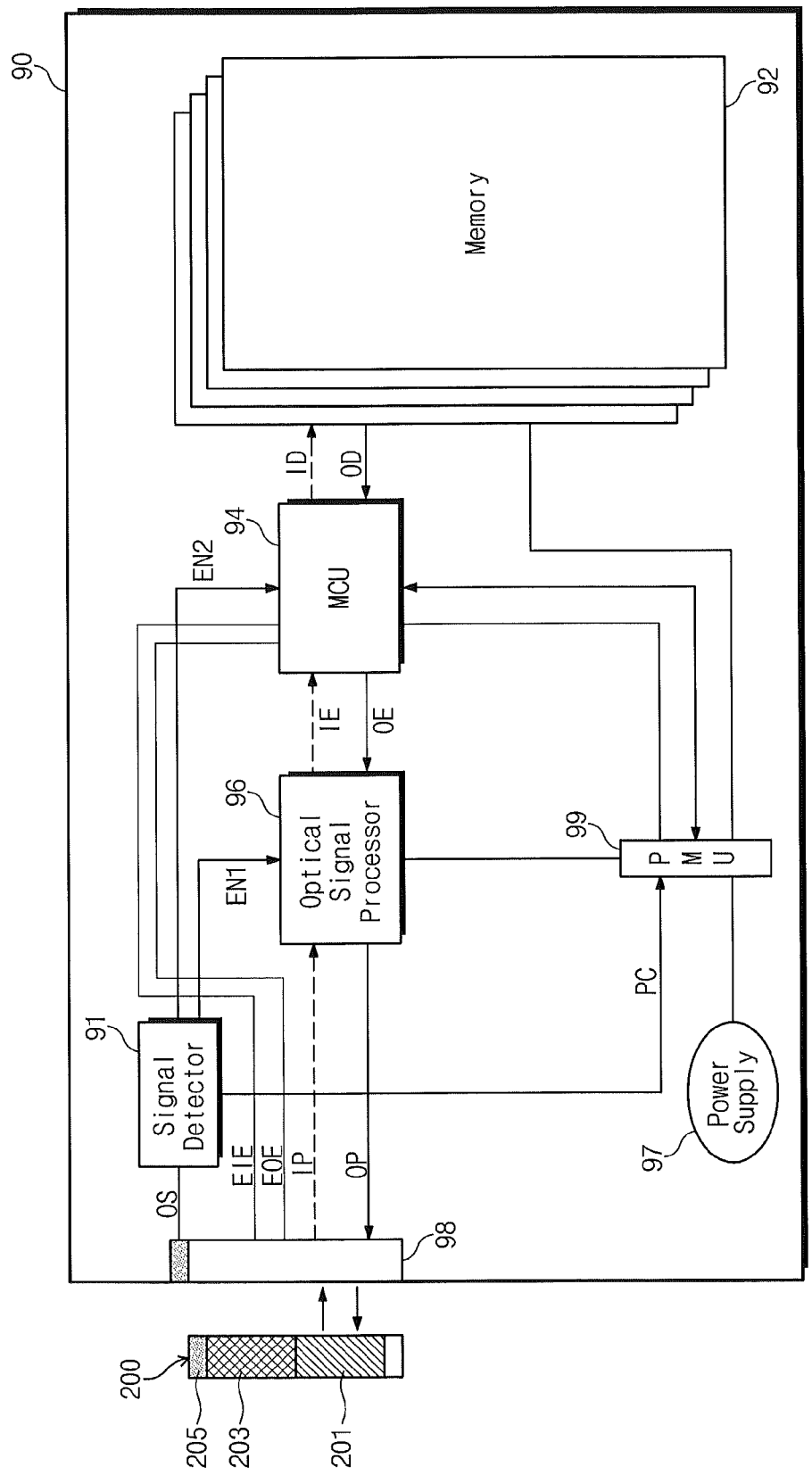

Referring to FIG. 11, the memory module 90 may include a signal detector 91, a memory chip 92, a controller 94, an optical signal processor 96, a power supply 97, an external input/output terminal 98, and a power management unit 99. The constituent elements 92, 94, 96, 97, 98, and 99 may be substantially the same as those in FIG. 10.

The signal detector 91 may detect whether an option signal OS is at a high level or at a low level, and may provide enable signals to the optical signal processor 96 and the controller 94 according to a detection result, respectively. Further, the signal detector 91 may transfer a power control signal PC to the power management unit 99 according to a level of the option signal OS.

As described with reference to FIG. 10, the optical signal processor 96 and the controller 94 may operate responsive to an enable signal EN1 or EN2. When the enable signal EN1 is provided to the optical signal processor 96 from the signal detector 91, the power management unit 99 may provide an internal power to the optical signal processor 96 from the power supply 97 in response to a power control signal PC, and may block or reduce a power supplied to the controller 94. When the enable signal EN2 is provided to the controller 94 from the signal detector 91, the power management unit 99 may block or reduce a power supplied to the optical signal processor 96 in response to the power control signal PC. Since a power supplied to the optical signal processor 96 and the controller 94 is controlled according to an electrical level of the option signal OS, it is possible to reduce a power unnecessarily consumed by units that are at an idle state.

Figure 12:
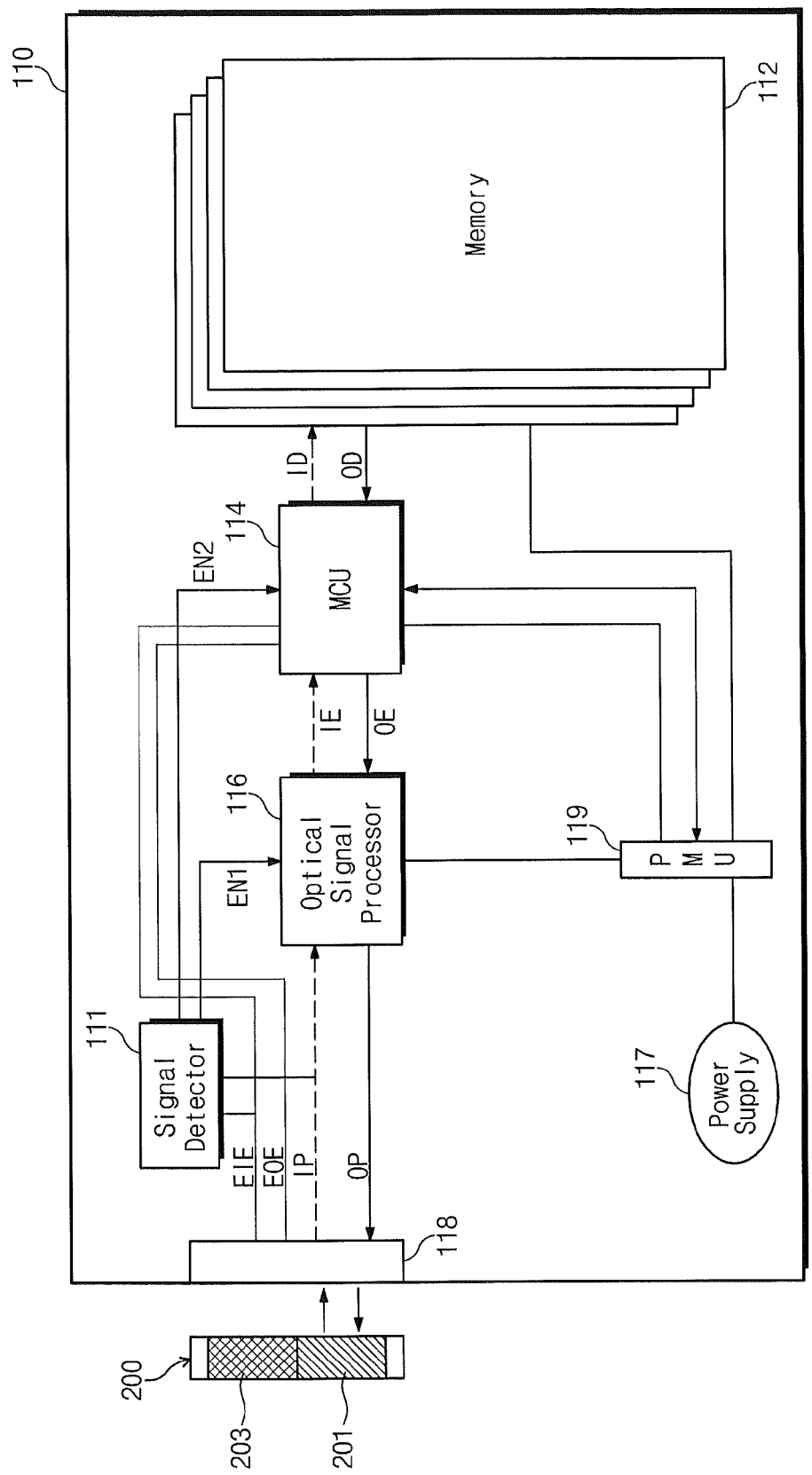

Referring to FIG. 12, the memory module 110 may include a signal detector 111, a memory chip 112, a controller 114, an optical signal processor 116, a power supply 117, an external input/output terminal 118, and a power management unit 119.

In example embodiments, the external input/output terminal 118 may be connected with the connector 200 having an optical signal terminal 201 and an electrical signal terminal 203. Herein, the connector 200 may not include an option terminal. An external input optical signal IP and an external input electrical signal EIE received via the external input/output terminal 118 may be provided to the signal detector 111. Since the signal detector 111 detects an optical signal or an electrical signal, it is possible to selectively operate the optical signal processor 116 and the controller 114 without an option signal.

The signal detector 111 may detect an external input optical signal IP input via the optical signal terminal 201 and an external input electrical signal EIE input via the electrical signal terminal 203. When the external input optical signal IP is detected by the signal detector 111, the signal detector 111 may transfer an enable signal EN1 to the optical signal processor 116. When the external input electrical signal EIE is detected by the signal detector 111, the signal detector 111 may transfer an enable signal EN2 to the controller 114. As described with reference to FIG. 10, the optical signal processor 116 and the controller 114 may operate responsive to an enable signal EN1 or EN2.

Figure 13:
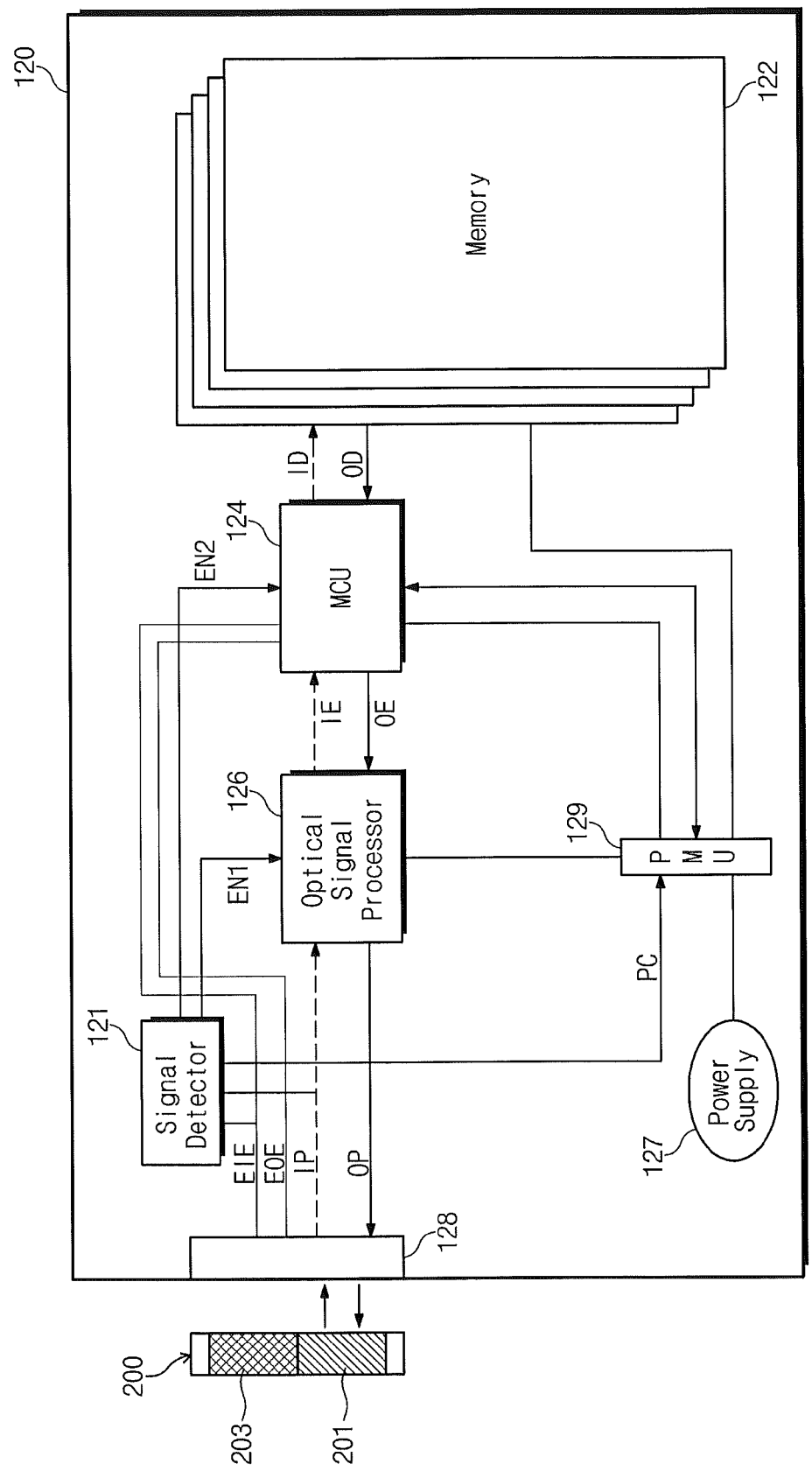

Referring to FIG. 13, the memory module 120 may include a signal detector 121, a memory chip 122, a controller 124, an optical signal processor 126, a power supply 127, an external input/output terminal 128, and a power management unit 129.

In example embodiments, the external input/output terminal 128 may be connected with the connector 200 having an optical signal terminal 201 and an electrical signal terminal 203. Herein, the connector 200 may not include an option terminal. An external input optical signal IP and an external input electrical signal EIE received via the external input/output terminal 128 may be provided to the signal detector 121.

As described with reference to FIG. 12, the signal detector 121 may detect an external input optical signal IP input via the optical signal terminal 201 and an external input electrical signal EIE input via the electrical signal terminal 203. As described with reference to FIG. 10, the optical signal processor 126 and the controller 124 may operate responsive to an enable signal EN1 or EN2. When the external input electrical signal EIE is received through the external input/output terminal 128, the signal detector 121 may transfer a power control signal PC to the power management unit 129, and the power management unit 129 may block an internal power supplied to the optical signal processor 126 in response to the power control signal PC. In example embodiments, if the external input optical signal IP is received through the external input/output terminal 128, the power management unit 129 may supply the internal power to the optical signal processor 126 in response to the power control signal PC. It is possible to reduce an unnecessarily consumed power by selectively supplying an internal power to units 122, 124, and 126 at a needed time according to a signal detected by the signal detector 121 without an option signal.

Figure 14:
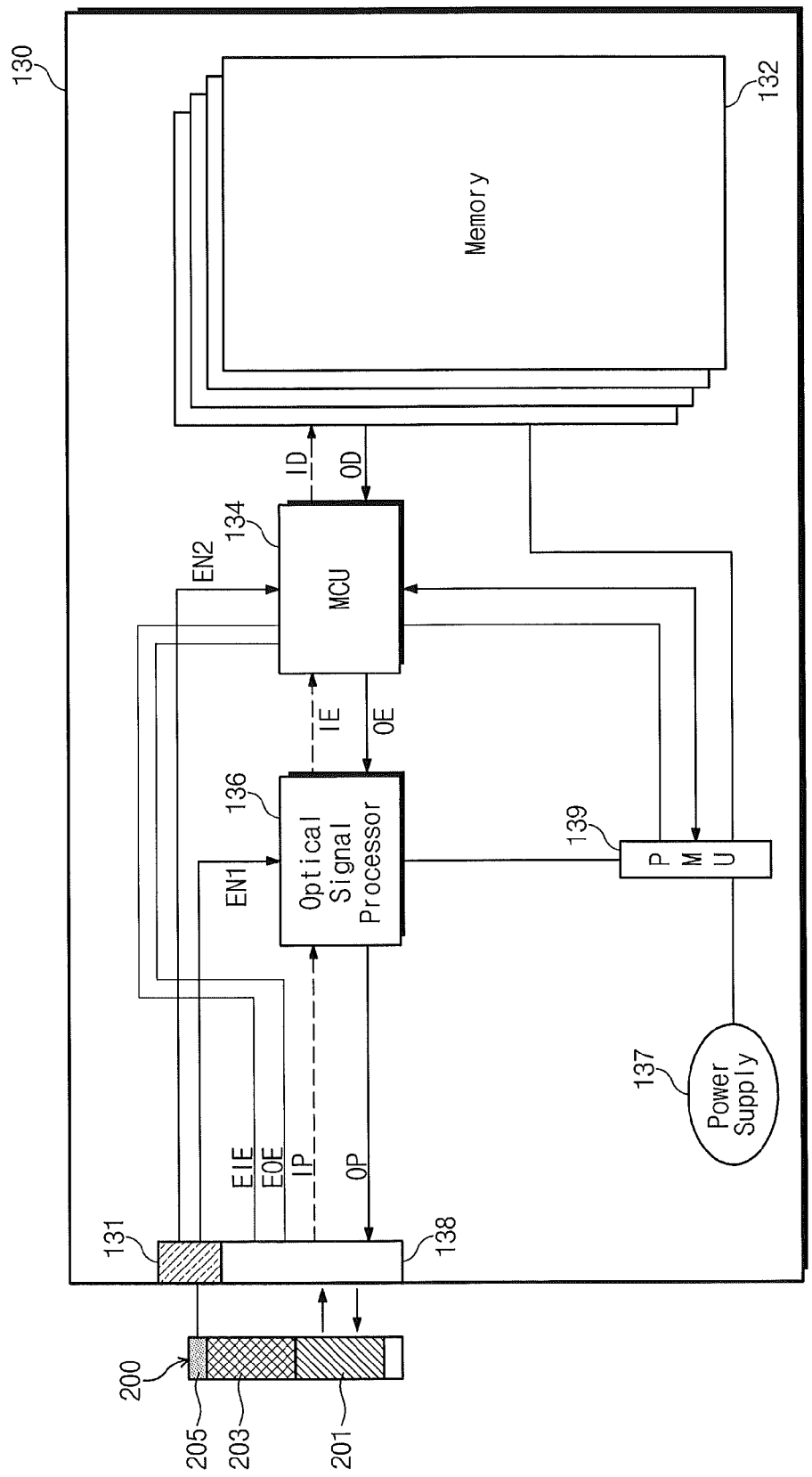

Referring to FIG. 14, the memory module 130 may include a signal detector 131, a memory chip 132, a controller 134, an optical signal processor 136, a power supply 137, an external input/output terminal 138, and a power management unit 139.

In example embodiments, the external input/output terminal 138 may be configured such that an optical signal input/output terminal, an electrical signal input/output terminal, and the signal detector 131 are integrated into one. Thus, a size of the memory module 130 may be reduced. The external input/output terminal 138 may be connected with the connector 200 having an optical signal terminal 201, an electrical signal 203, and an option terminal 205. The optical signal terminal 201 may be connected with the optical signal input/output terminal, and the electrical signal terminal 203 may be connected to the electrical signal input/output terminal. The option terminal 205 of the connector 200 may be connected directly to the signal detector 131.

As described with reference to FIG. 12, the signal detector 131 integrated at the external input/output terminal 138 may detect an external input optical signal IP input via the optical signal terminal 201 and an external input electrical signal EIE input via the electrical signal terminal 203. When the external input optical signal IP is detected by the signal detector 131, the signal detector 131 may transfer an enable signal EN1 to the optical signal processor 136. When the external input electrical signal EIE is detected by the signal detector 131, the signal detector 131 may transfer an enable signal EN2 to the controller 134. As described with reference to FIG. 10, the optical signal processor 136 and the controller 134 may operate responsive to an enable signal EN1 or EN2.

Figure 15:
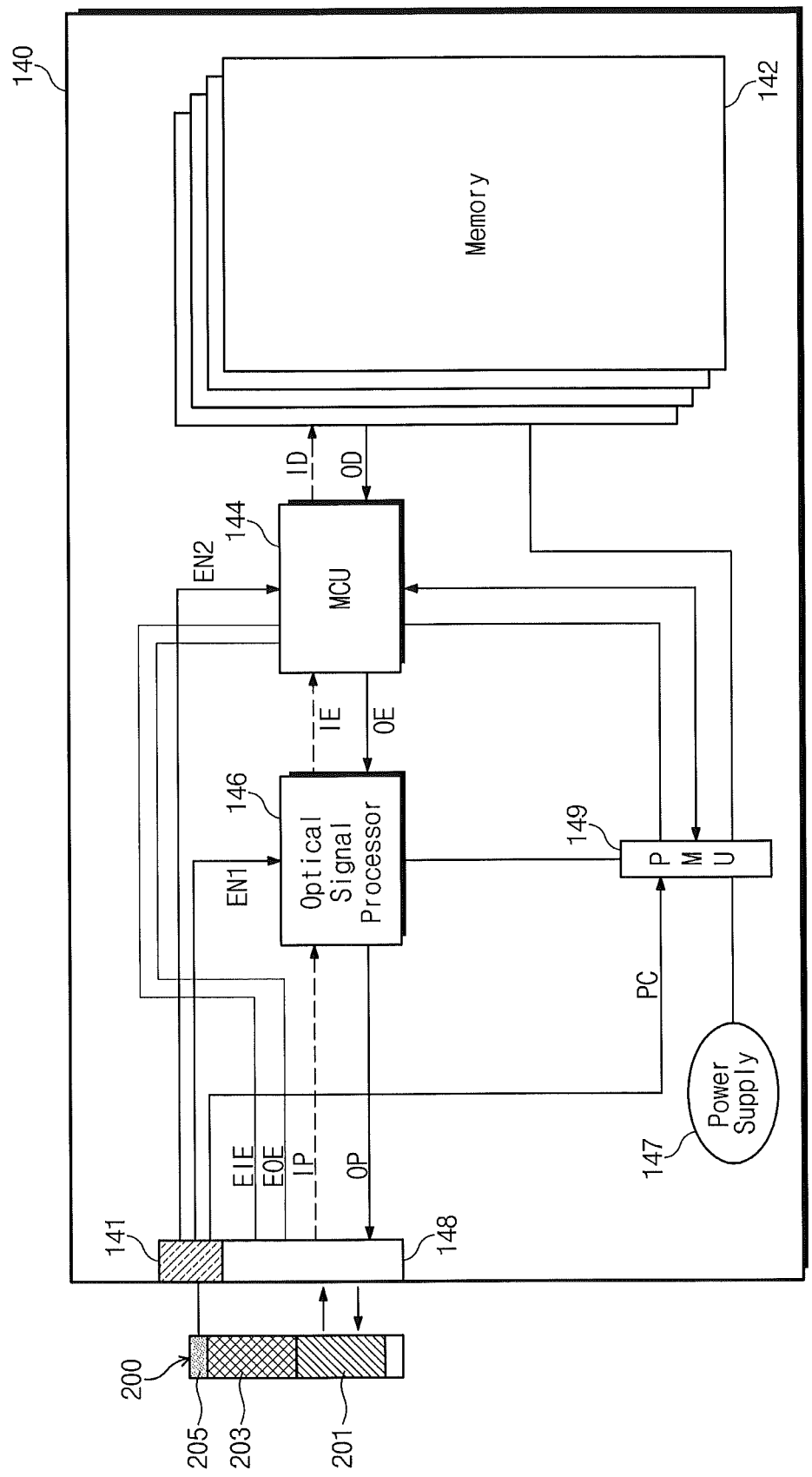

Referring to FIG. 15, the memory module 140 may include a signal detector 141, a memory chip 142, a controller 144, an optical signal processor 146, a power supply 147, an external input/output terminal 148, and a power management unit 149.

In example embodiments, as described with reference to FIG. 14, the external input/output terminal 148 may have the signal detector 141. The signal detector 141 may detect whether an input signal is an optical signal or an electrical signal. an enable signal EN1 or EN2 may be provided selectively to the optical signal processor 146 and the detector 141 according to the optical signal or electrical signal detected at the signal detector 141. That is, when the optical signal is detected by the signal detector 141, the enable signal EN1 may be transferred to the optical signal processor 146. If the electrical signal is detected by the signal detector 141, the enable signal EN2 may be transferred to the controller 144 such that an electrical signal EIE input from an external device is directly provided to the controller 144.

The signal detector 141 may transfer a power control signal PC to the power management unit 149 according to whether a signal input through the external input/output terminal 148 is an optical signal or an electrical signal. When the electrical signal is input through the external input/output terminal 148, the power management unit 149 may supply an internal power to the optical signal processor 146 in response to the power control signal PC. As the signal detector 141 is integrated with the external input/output terminal 148, a size of the memory module 140 may be reduced. An unnecessarily consumed power may be reduced by selectively supplying an internal power to units 142, 144, and 146 at a needed time according to a signal detected at the signal detector 141.

In embodiments described in FIGS. 9 to 15, external input/output terminals 78, 88, 98, 118, 128, 138, and 148 may include optical signal power terminals capable of transferring a high power optical signal HO (refer to FIG. 8) for supplying a power to memory modules 70, 80, 90, 110, 120, 130, and 140, respectively. The high power optical signal HO may be converted into an electrical signal through a photoelectric conversion unit 61 (refer to FIG. 8) such that internal powers of the memory modules 70, 80, 90, 110, 120, 130, and 140 are charged.

Figure 16:
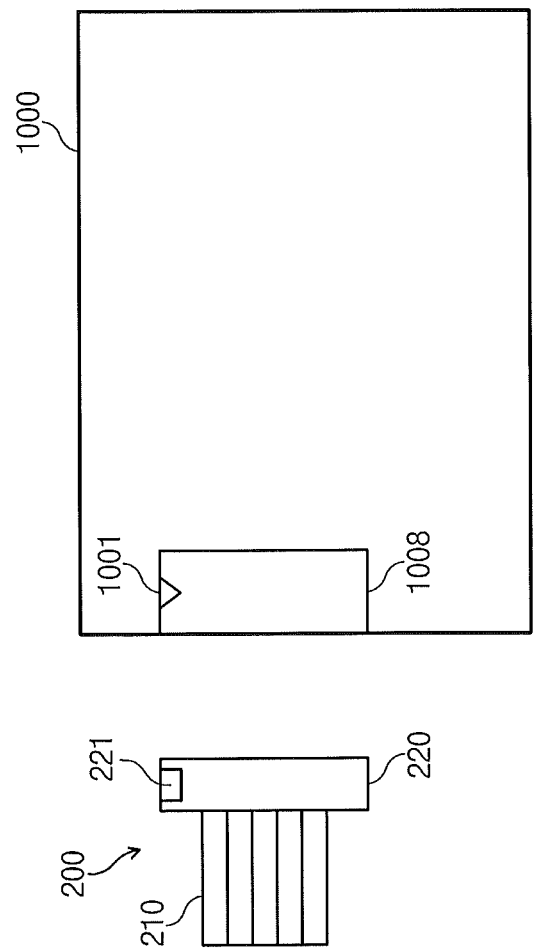
FIG. 16 is a diagram illustrating a connector connecting an external device and a memory module according to embodiments of FIGS. 9 to 15.

FIG. 16 is a diagram illustrating a connector connecting an external device and a memory module according to embodiments of FIGS. 9 to 15.

Referring to FIG. 16, a memory module 1000 may be one of memory modules 70, 80, 90, 110, 120, 130, and 140 illustrated in FIGS. 9 to 15.

A connector 200 may have an optical signal terminal, an electrical signal terminal, and an option terminal as described with reference to FIGS. 9 to 15.

The connector 200 may have an electrical cable 210 for transferring an electrical signal between an external device and the memory module 1000, an optical cable 210 for transferring an optical signal between the external device and the memory module 1000, and a socket 220 having terminals connected with the electrical cable 210 and the optical cable 210. The socket 220 may have a groove 221 capable of being coupled with an external input/output terminal 1008 of the memory module 1000.

The external input/output terminal 1008 of the memory module 1000 may include a switch 1001 for recognizing whether an option terminal exists or not. In case that the connector 200 has an option terminal, the switch 1001 may be turned on when the socket 220 is inserted into the external input/output terminal 1008 of the memory module 1000. In this case, an electrical signal, an optical signal, and an option signal may be input through the external input/output terminal 1008 of the memory module 1000.

Figure 17:
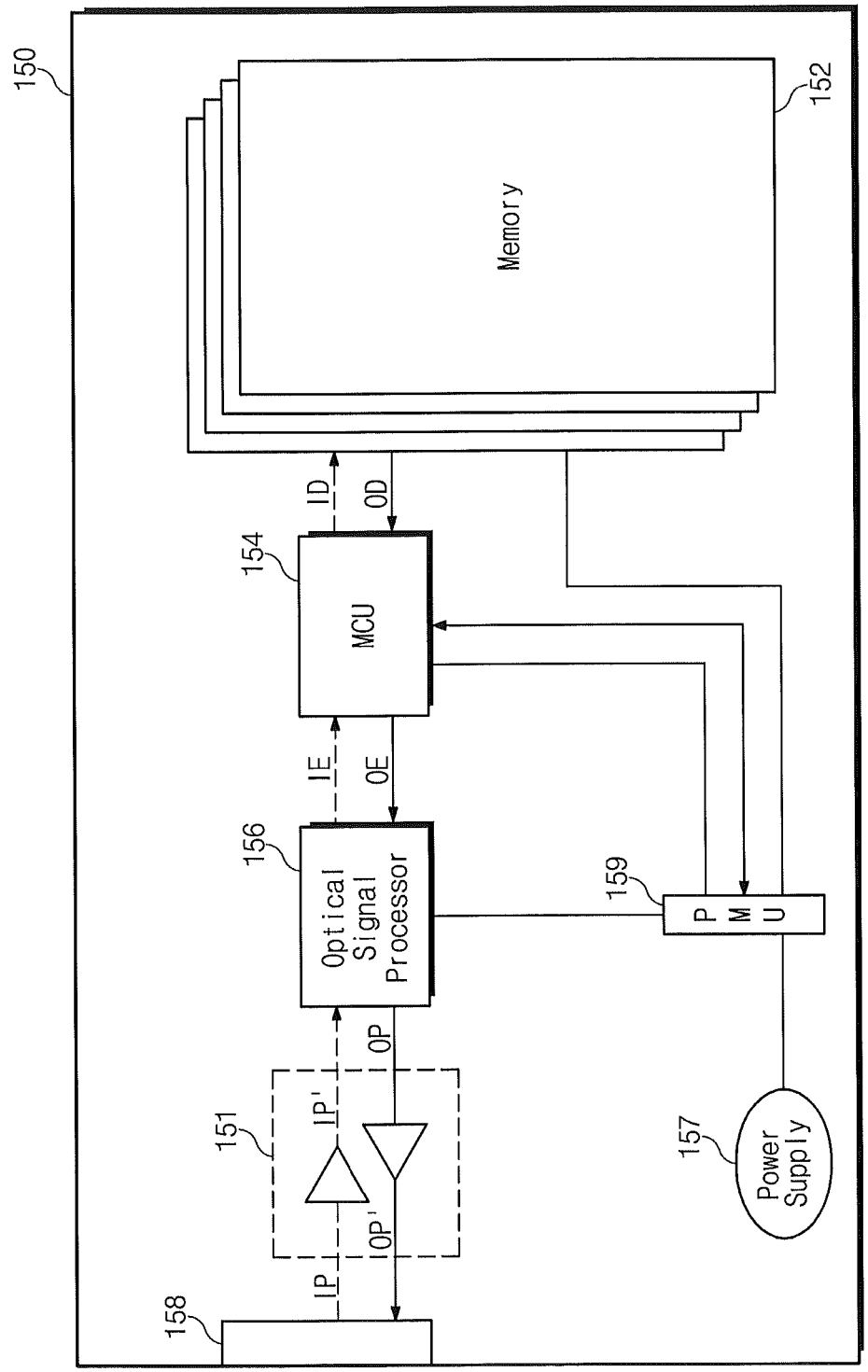
FIGS. 17 to 19 are diagrams illustrating memory modules according to other embodiments of the inventive concept.
Figure 18:
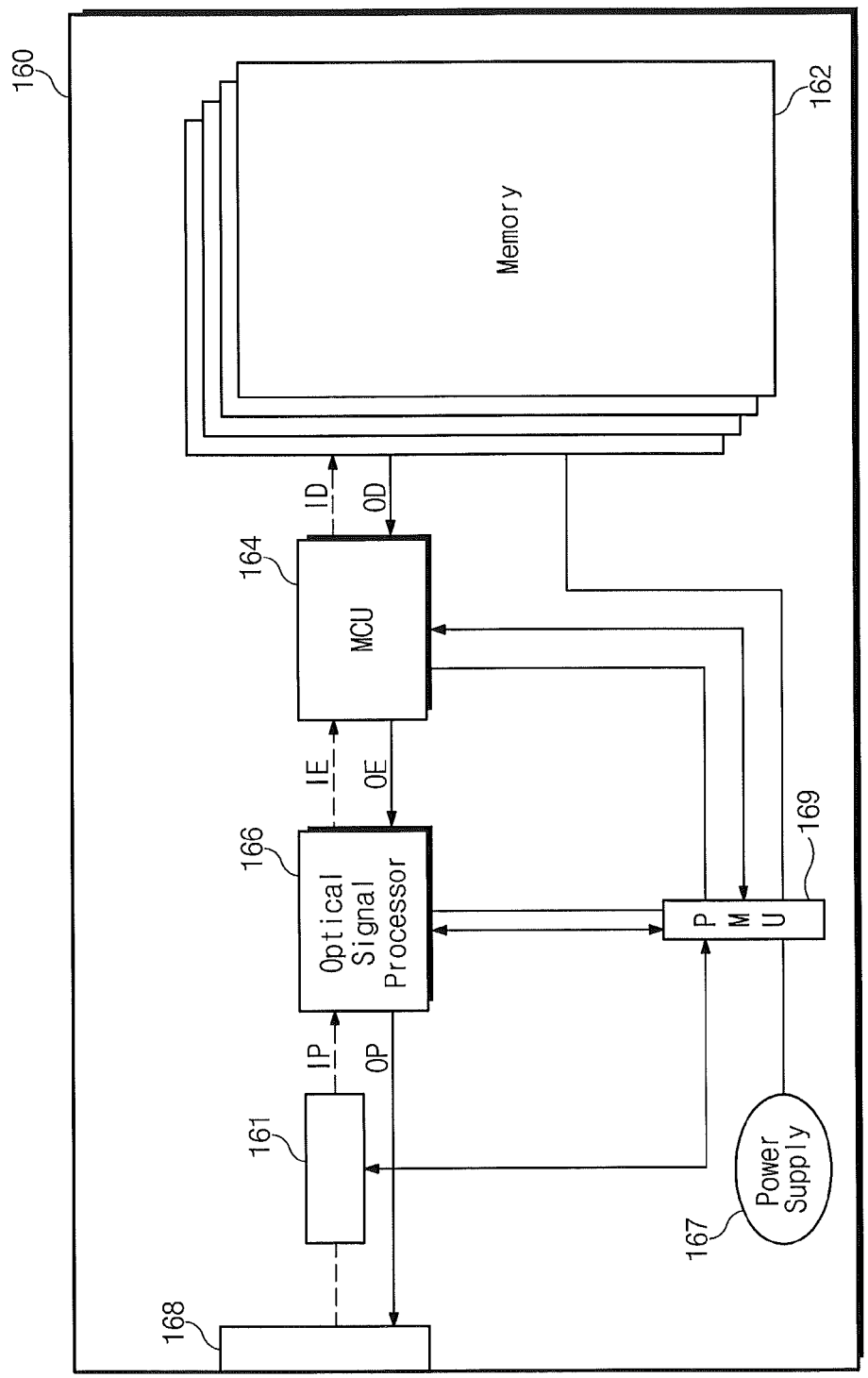
Figure 19:
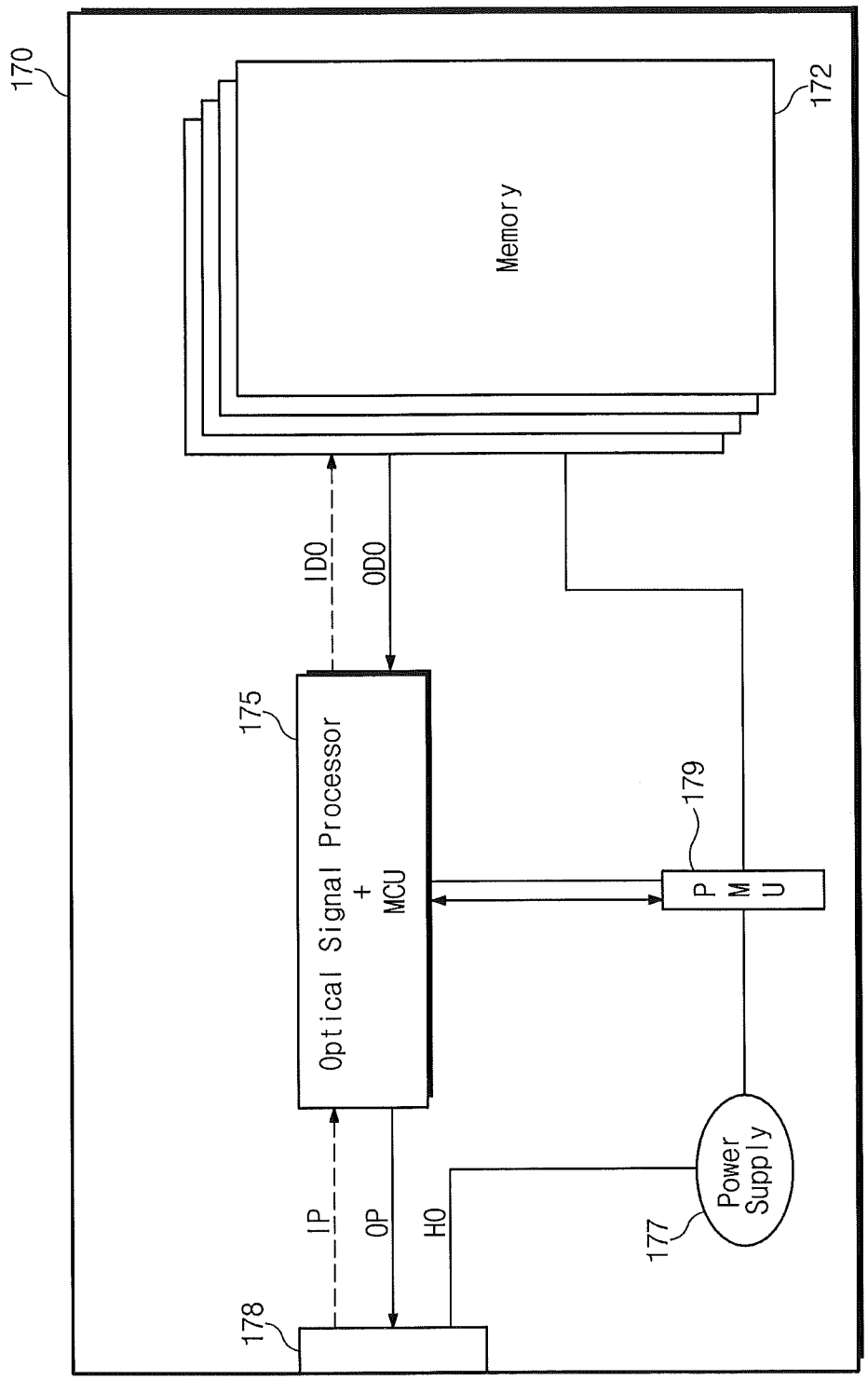

FIGS. 17 to 19 are diagrams illustrating memory modules according to other embodiments of the inventive concept.

Referring to FIG. 17, the memory module 150 may include an optical signal buffer 151, a memory chip 152, a controller 154, an optical signal processor 156, a power supply 157, an external input/output terminal 158, and a power management unit 159.

In example embodiments, the optical signal buffer 151 may be connected between the external input/output terminal 158 and the optical signal processor 156.

Characteristics of external input and output optical signals IP and OP may be lowered due to a noise or signal attenuation. An optical signal input and output through the memory module 150 may be recovered through the optical signal buffer 151. In detail, the optical signal buffer 151 may amplify levels of input and output optical signals IP and OP. The optical signal buffer 151 may also filter a noise of input and output optical signals IP and OP.

The optical signal processor 156 may convert an optical signal into an electrical signal and an electrical signal into an optical signal. In detail, the optical signal processor 156 may convert the external input optical signal IP filtered through the optical signal buffer 151 into an internal input electrical signal IE to provide it to the controller 154. The optical signal processor 156 may also convert an internal output electrical signal OE transferred from the controller 154 into an external output optical signal OP to transfer it to the optical signal buffer 151. The external output optical signal OP may be amplified or filtered by the optical signal buffer 151 to then be output to the external input/output terminal 158.

The controller 154 may control the memory chip 152 and the memory module 150. The controller 154 may be formed of a micro controller unit (MCU), and may be formed of a single chip or a plurality of chips. The controller 154 may provide a data signal ID to the memory chip 152 in response to an internal input signal IE transferred from the optical signal processor 156, and may transfer an internal output signal OE to the optical signal processor 156 in response to a data signal OD output from the memory chip 152.

The power supply 157 may be an exchangeable or chargeable battery as an internal power embedded in the memory module 150. The power management unit 159 may connect a power to the units 156, 154, and 152 selectively under the control of the controller 156. Thus, a life of a battery mounted at the memory module and a life of a battery of an application apparatus may be extended by reducing a power unnecessarily consumed.

Referring to FIG. 18, the memory module 160 may include an optical signal detector 161, a memory chip 162, a controller 164, an optical signal processor 166, a power supply 167, an external input/output terminal 168, and a power management unit 169.

In example embodiments, the optical signal detector 161 may be connected between the external input/output terminal 168 and the optical signal processor 166. The optical signal detector 161 may transfer an external input optical signal IP input through the external input/output terminal 168 to the optical signal processor 166, and may detect the external input optical signal IP to control the power management unit 169.

In example embodiments, the power management unit 169 may exchange a control signal for recognizing an operating state of each of the constituent elements 161, 162, 164, and 166. The power management unit 169 may control supplying of an internal power according to an operating state of each of the constituent elements 162, 164, and 166.

In detail, supplying of an internal power to the optical signal processor 166 may be controlled according to whether an external input optical signal IP is detected at the optical signal detector 161. If an external input optical signal IP is not detected at the optical signal detector 161, that is, when the optical signal processor 166 is at an idle state, the power management unit 169 may supply a power to the memory chip 162 and the controller 164, and may block a power to the optical signal processor 166 or maintain a power by minimum. If an external input optical signal IP is detected at the optical signal detector 161, that is, when the controller 164 and the memory chip 162 are at an idle state, the power management unit 169 may supply a power to the optical signal processor 166. At this time, a power to the controller 164 and the memory chip 162 may be maintained by minimum, or supplying of the internal power may be blocked. Thus, it is possible to reduce unnecessary power consumption of the memory module 160.

When the controller 164 and the memory chip 162 are at an idle state, the power management unit 169 may supply a power to the memory chip 162. At this time, a power to the controller 164 and the optical signal processor 166 may be maintained by minimum, or supplying of the internal power may be blocked.

Referring to FIG. 19, the memory module 170 may include a memory chip 172, a united controller 175, a power supply 177, an external input/output terminal 178, and a power management unit 179.

The external input/output terminal 178 may include optical signal input/output terminals capable of transferring input/output optical signals IP and OP and an optical signal power terminal capable of transferring a high power optical signal HO for supplying a power to the memory module 170.

The united controller 175 may be a semiconductor chip that an optical signal processor and a memory controller are integrated into one chip. Thus, a size of the memory module 170 may be reduced. In example embodiments, the united controller 175 may provide a data signal to the memory chip 172 in response to an external input optical signal IP input from an external device, or may output an external output optical signal OP in response to a data signal output from the memory chip 172. Data transfer between the united controller 175 and the memory chip 172 may be performed using an optical signal. In detail, the united controller 175 may transfer an input data optical signal IDO to the memory chip 172 in response to an input of an external input optical signal IP, and may output an external output optical signal OP to the external input/output terminal 178 in response to an output data optical signal ODO output from the memory chip 172.

The power supply 177 may be an exchangeable or chargeable battery as an internal power embedded in the memory module 150. The power supply 177 may be charged by the high power optical signal HO input through the external input/output terminal 178. The power supply 177 of the memory module 170 can be charged by an electrical signal obtained by converting the high power optical signal HO through a photoelectric conversion unit 61 (refer to FIG. 8).

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A memory module comprising:
   a memory chip;
   an external input/output terminal having an electrical signal input/output terminal and an optical signal input/output terminal;
   an optical signal processor configured to convert a first optical signal input through the optical signal input/output terminal into a first internal electrical signal and to convert a second internal electrical signal into a second optical signal; and
   a controller configured to provide a first data signal to the memory chip in response to a first external electrical signal input through the electrical signal input/output terminal or the first internal electrical signal and to transfer the second internal electrical signal to the optical signal processor or to output a second external electrical signal to the electrical signal input/output terminal in response to a second data signal output from the memory chip.

2. The memory module of claim 1, wherein the external input/output terminal includes an option terminal receiving an option signal which has a first electrical level when an optical signal is received and a second electrical level when the first external electrical signal is received.

3. The memory module of claim 2, further comprising:
   a signal detector configured to detect an electrical level of the option signal.

4. The memory module of claim 3, wherein when the option signal is at a first electrical level, the signal detector transfers an enable signal to the optical signal processor to input and output the first and second optical signals.

5. The memory module of claim 3, wherein when the option signal is at a second electrical level, the signal detector transfers an enable signal to the controller to input and output the first and second external electrical signals.

6. The memory module of claim 3, further comprising:
   a power management unit configured to supply a power to the optical signal processor, the controller, and the memory chip; and
   wherein the power management unit selectively supplies a power to the optical signal processor according to a signal detected at the signal detector.

7. The memory module of claim 2, wherein the optical signal processor receives and outputs first and second optical signals through the optical signal input/output terminal when the option signal is at a low level, and the controller receives and outputs first and second electrical signals through the electrical signal input/output terminal when the option signal is at a high level.

8. The memory module of claim 2, further comprising:
a power management unit configured to selectively supply a power to the optical signal processor, the controller, and the memory chip according to the option signal.

9. The memory module of claim 1, further comprising:
a signal detector configured to detect whether a signal input through the external input/output terminal is an electrical signal or an optical signal.

10. The memory module of claim 9, further comprising:
a power management unit configured to selectively supply a power to the optical signal processor, the controller, and the memory chip according to a detection signal of the signal detector.

11. The memory module of claim 1, wherein the external input/output terminal is connected with a connector to which an electrical cable for transferring an electrical signal and an optical cable for transferring an optical signal are connected.

12. A memory module comprising:
a memory chip;
an optical signal processor configured to convert a first optical signal into a first internal electrical signal and to convert a second internal electrical signal into a second optical signal;
a controller configured to provide a first data signal to the memory chip in response to the first internal electrical signal and to transfer the second internal electrical signal to the optical signal processor in response to a second data signal output from the memory chip; and
an optical signal power terminal receiving a high power optical signal,
wherein a power is supplied to the memory chip, the optical signal processor, or the controller using the high power optical signal input through the optical signal power terminal.

13. The memory module of claim 12, further comprising:
a power supply configured to supply a power to the memory chip, the optical signal processor, and the controller and being charged by the high power optical signal.

14. The memory module of claim 13, further comprising:
a photoelectric conversion unit configured to convert the high power optical signal into an electrical signal to transfer the electrical signal to the power supply.

15. The memory module of claim 14, further comprising:
a power management unit configured to supply the electrical signal converted by the photoelectric conversion unit or an internal power to the memory chip, the optical signal processor, or the controller.

16. The memory module of claim 12, further comprising:
an optical input/output terminal configured to receive the first optical signal from an external device and to output the second optical signal to the external device.

17. The memory module of claim 16, further comprising:
an optical signal buffer connected between the optical input/output terminal and the optical signal processor and configured to filter the first and second optical signals.

18. The memory module of claim 12, further comprising:
an optical signal detector connected between the optical input/output terminal and the optical signal processor and configured to detect an input of the first optical signal.

19. The memory module of claim 18, further comprising:
a power management unit configured to control supplying of the internal power to the optical signal processor according to whether the first optical signal is detected by the optical signal detector.

20. The memory module of claim 12, wherein the optical signal processor and the controller are integrated into one semiconductor chip.

* * * * *